(12) United States Patent
Leitheiser et al.

(10) Patent No.: US 7,979,565 B2
(45) Date of Patent: Jul. 12, 2011

(54) SYSTEM AND METHOD TO PROVIDE A NETWORK SERVICE

(75) Inventors: Gregory R. Leitheiser, Coppell, TX (US); Charles Fenton, Ypsilanti, MI (US); Todd L. Margo, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/199,202

(22) Filed: Aug. 27, 2008

(65) Prior Publication Data

US 2010/0057919 A1 Mar. 4, 2010

(51) Int. Cl.
*G06F 15/16* (2006.01)

(52) U.S. Cl. ........ 709/228; 709/227; 709/229; 709/239; 370/409

(58) Field of Classification Search .......... 709/227–229, 709/239; 370/409
See application file for complete search history.

(56) References Cited

U.S. PATENT DOCUMENTS

| | | | | |
|---|---|---|---|---|
| 6,256,389 | B1* | 7/2001 | Dalrymple et al. | 370/352 |
| 6,438,125 | B1* | 8/2002 | Brothers | 370/352 |
| 6,493,349 | B1* | 12/2002 | Casey | 370/409 |
| 6,507,854 | B1* | 1/2003 | Dunsmoir et al. | 715/201 |
| 6,662,221 | B1* | 12/2003 | Gonda et al. | 709/223 |
| 7,644,171 | B2* | 1/2010 | Sturniolo et al. | 709/230 |
| 2002/0006123 | A1* | 1/2002 | Angelico et al. | 370/348 |
| 2002/0106071 | A1* | 8/2002 | Uppaluru et al. | 379/265.02 |
| 2002/0118638 | A1* | 8/2002 | Donahue et al. | 370/229 |
| 2002/0174206 | A1* | 11/2002 | Moyer et al. | 709/221 |
| 2003/0159075 | A1* | 8/2003 | Miyazaki | 713/300 |
| 2003/0172145 | A1* | 9/2003 | Nguyen | 709/223 |
| 2004/0003070 | A1* | 1/2004 | Fernald et al. | 709/223 |
| 2005/0108246 | A1* | 5/2005 | Dillon | 707/10 |
| 2005/0169314 | A1* | 8/2005 | Beaudoin et al. | 370/480 |
| 2006/0291506 | A1* | 12/2006 | Cain | 370/486 |
| 2007/0016621 | A1 | 1/2007 | Havewala et al. | |
| 2007/0038759 | A1* | 2/2007 | Hanson et al. | 709/227 |
| 2007/0124474 | A1* | 5/2007 | Margulis | 709/226 |
| 2007/0240209 | A1* | 10/2007 | Lewis et al. | 726/15 |
| 2007/0265000 | A1* | 11/2007 | Hanson et al. | 455/432.1 |
| 2008/0065991 | A1* | 3/2008 | Grimes et al. | 715/719 |
| 2008/0133536 | A1 | 6/2008 | Bjorner et al. | |
| 2008/0181202 | A1* | 7/2008 | O'Brien et al. | 370/352 |
| 2008/0279222 | A1* | 11/2008 | Fuller et al. | 370/501 |
| 2009/0019367 | A1* | 1/2009 | Cavagnari et al. | 715/716 |
| 2010/0017600 | A1* | 1/2010 | Lepeska et al. | 713/163 |

\* cited by examiner

*Primary Examiner* — Alina N. Boutah
(74) *Attorney, Agent, or Firm* — Steven M. Greenberg, Esq.; Carey, Rodriguez, Greenberg & Paul

(57) ABSTRACT

A method of providing a network service includes accepting an incoming transmission control protocol/internet protocol (TCP/IP) connection from a user device at a point of presence (POP) proxy server. The TCP/IP connection corresponds to a particular application that is not stored at the POP proxy server. The method also includes relaying the TCP/IP connection from the POP proxy server to a remote application server that stores the particular application via an accelerated network link. Further, the method includes streaming data between the user device and the remote application server after relaying the TCP/IP connection to the remote application server.

10 Claims, 4 Drawing Sheets

SYSTEM AND METHOD TO PROVIDE A NETWORK SERVICE

FIELD OF THE DISCLOSURE

The present disclosure generally relates to communications networks, and more particularly relates to providing a network service.

BACKGROUND

Network services can suffer performance limitations due to long-distance data transfer. In order to scale its services, a network service provider may contract with a content delivery network provider, which often requires the network service provider to relinquish control over its infrastructure. Alternatively, the network service provider can deploy collections of point-of-presence (POP) servers local to (e.g., within 200 miles of) all potential users of an Internet application. Deploying collections of POP servers can require significant resources, expertise and support.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to particular embodiments. However, it should be understood that these embodiments provides only a few examples of the many advantageous uses of the innovative teachings herein. In general, statements made in the specification of the present application do not necessarily limit any of the various claimed systems, methods or computer-readable media. Moreover, some statements may apply to some innovative features but not to others.

According to one embodiment, a method of providing a network service includes accepting an incoming transmission control protocol/internet protocol (TCP/IP) connection from a user device at a point of presence (POP) proxy server. The TCP/IP connection corresponds to a particular application that is not stored at the POP proxy server. The method also includes relaying the TCP/IP connection from the POP proxy server to a remote application server that stores the particular application via an accelerated network link. Further, the method includes streaming data between the user device and the remote application server after relaying the TCP/IP connection to the remote application server.

According to another embodiment, a system to provide a network service includes a POP proxy server including processing logic and memory accessible to the processing logic. The memory includes instructions executable by the processing logic to accept an incoming TCP/IP connection from a user device. The TCP/IP connection corresponds to a particular application. The memory also includes instructions executable by the processing logic to relay the TCP/IP connection from the POP proxy server to a remote application server that stores the particular application, via an accelerated network link. Further, the memory includes instructions executable by the processing logic to stream data between the user device and the remote application server after relaying the TCP/IP connection to the remote application server.

In yet another embodiment, a computer-readable medium includes processor-readable instructions that are executable by processing logic to perform a method. The method includes accepting an incoming TCP/IP connection from a user device at a POP proxy server, where the TCP/IP connection corresponds to a particular application; and simulating a local presence of a remote application server that stores the particular application, without storing the particular application at the POP proxy server.

Figure 1:
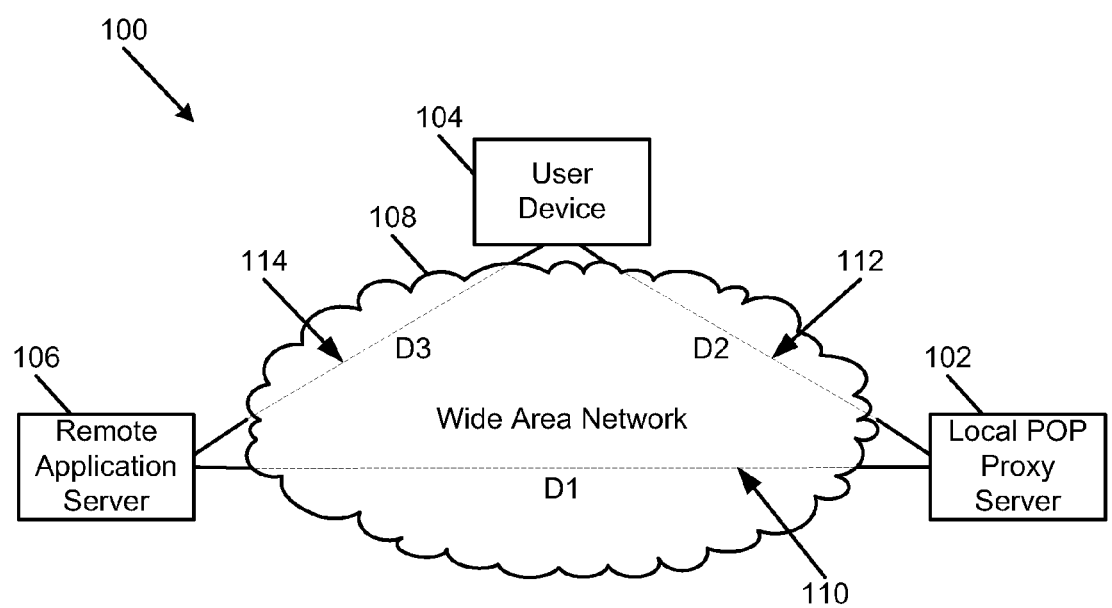
FIG. 1 is a block diagram illustrating a particular embodiment of a system to provide a network service.

FIG. 1 illustrates a particular embodiment of a system 100 to provide a network service. The system 100 includes a point of presence (POP) proxy server 102 that communicates with a user device 104, such as a personal computer, laptop or other user device. The POP proxy server 102 communicates with the user device 104 over a wide area network (WAN) 108, such as the Internet. The POP proxy server 102 also communicates with a remote application server 106 via the WAN 108. The POP proxy server 102 is adapted to communicate with the remote application server 106 via a data link (D1) 110. The POP proxy server 102 communicates with the user device 104 via another data link (D2) 112. Further, the user device 104 can communicate with the remote application server 106 via still another data link (D3) 114.

In a particular embodiment, the POP proxy server 102 is adapted to receive and accept an incoming transmission control protocol/internet protocol (TCP/IP) connection from the user device 104. For instance, the user device 104 can be adapted to send a TCP/IP connection request corresponding to a particular application, such as a web application, to the POP proxy server 102 via the WAN 108. The particular application can be associated with a network service, such as hypertext transfer protocol (HTTP) or file transfer protocol (FTP).

After accepting the TCP/IP connection from the user device 104, the POP proxy server 102 is adapted to simulate a local presence of the remote application server 106, without storing the particular application at the POP proxy server 102. For example, the POP proxy device 102 is adapted to relay the TCP/IP connection to the remote application server 106 over the D1 data link 110. The remote application server 106 stores the particular application. In some embodiments, where the POP proxy server 102 communicates with multiple remote application servers, the POP proxy server 102 can identify the remote application server 106 associated with the particular application based on one of a plurality of domain name system (DNS) records or other methods. In yet another embodiment, the POP proxy server 102 can communicate with multiple remote application servers corresponding to a single application, such that the POP proxy server 102 is adapted to identify the remote application server 106 based on one or more load-balancing rules.

The D1 data link 110 can be an accelerated data link, such as a virtual private network link, a T1 link, a WAN accelerator link, or another accelerated data link. In another embodiments, the accelerated data link can be characterized by a data reduction technique, user datagram protocol (UDP) tunneling, advanced TCP flow control, Lempel Ziv (LZ) compression, an industry standard IP acceleration technique, or any combination thereof. In one embodiment, the POP proxy server 102 can initiate the accelerated data link by, for instance, opening a virtual private network (VPN) tunnel between the POP proxy server 102 and the remote application server 106. The accelerated data link is characterized by a data transfer rate that is greater than or equal to a data transfer rate of the D2 data link 112 between the user device 104 and the POP proxy server 102.

The POP proxy server 102 is adapted to stream data between the user device 104 and the remote application server 106 after relaying the TCP/IP connection to the remote application server 106 via the D1 data link 110. For instance, the POP proxy server 102 can be adapted to send data packet by packet to the remote application server 106 or to the user device 104, rather than collecting the data in order to send whole queries or responses between the user device 104 and the remote application server 106. The streamed data can include, for example, dynamic data, file transfer data, static content data, web application data, other data, or any combination thereof.

In one embodiment, the POP proxy device 102 can be adapted to receive data from the user device 104 via the D2 data link 112 at a first data transfer rate, and to receive data from the remote application server 106 via the accelerated D1 data link 110 at a second data transfer rate, where the second data transfer rate is at least 50% greater than the first data transfer rate. As a result, an effective rate of communication between the user device 104 and the remote application server 106 is approximately equal to the first data transfer rate.

In an illustrative, non-limiting example, the POP proxy server 102 can be located in Hamburg, Germany; the user device 104 can be located in Berlin, Germany; and the remote application server 106 can be located in New York. The remote application server 106 stores a particular application, whereas the POP proxy server 102 does not. This can reduce costs to a network service provider, as separate instances of the particular application are not stored and do not have to be supported at local sites. Such cost savings increase where the remote application server 106 serves more than one POP proxy server.

In this example, the D1 data link 110 can be characterized by a data transfer rate of approximately 150 Mbps. The D2 data link 112 connecting the user device 104 with the POP proxy server 102 can be characterized by a data transfer rate of greater than or equal to approximately 2 Mbps, such as 2.4 Mbps. Further, the D3 data link 114 connecting the user device 104 with the remote application server 106 can be characterized by a data transfer rate of approximately 150 Kbps. Hence, despite the greater distance between the user device 104 and the remote application server 106, the user device 104 can receive data from the remote application server 106 at the data transfer rate of the D2 data link 112, rather than the slower data transfer rate of the D3 data link 114. Hence, data streamed by the POP proxy server 102 would be accessible to the user device at a data transfer rate greater than or equal to approximately 2 Mbps.

Figure 2:
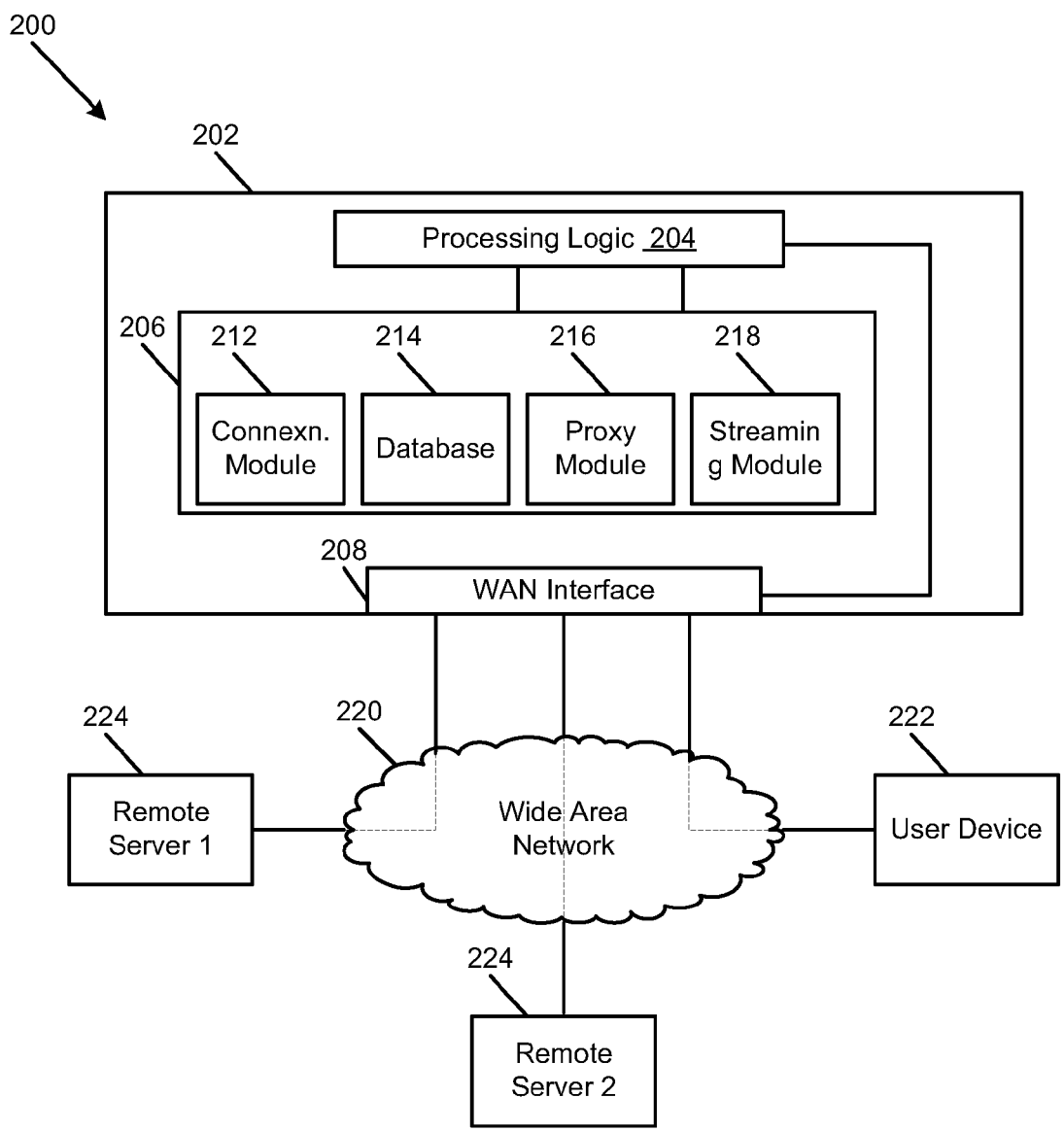
FIG. 2 is a block diagram illustrating a second particular embodiment of a system to provide a network service.

FIG. 2 illustrates a second particular embodiment of a system 200 to provide a network service. The system 200 includes a POP proxy server 202 that communicates with a user device 222 and with remote application servers 224 and 226 via a WAN 220. The POP proxy server 202 includes processing logic 204 and memory 206 accessible to the processing logic 204. In an illustrative embodiment, the processing logic 204 is coupled to a WAN interface 208 that is adapted to facilitate communication between the POP proxy server 202 and the WAN 220.

The memory 206 includes a plurality of modules 212-218. The modules 212-218 can include computer instructions that are readable and executable by the processing logic 204 to implement various functions of the POP proxy server 202 with respect to providing a network service. For example, the modules 212-218 can represent various aspects of one or more software applications, operating systems, or other computer programs. In other embodiments, the modules 212-218 can be implemented as hardware logic or a combination of hardware logic and computer instructions.

For example, the memory 206 includes a connection module 212 that is executable by the processing logic 204 to receive and accept an incoming TCP/IP connection from the user device 222. The connection corresponds to a network service, such as HTTP or FTP, which is associated with a particular application. In a particular embodiment, the memory includes a database 214 to store data associating each of the remote application servers 224, 226 with at least one of a plurality of applications.

The memory 206 also includes a proxy module 216 that is executable by the processing logic 204 to relay the TCP/IP connection received from the user device 222 to a remote application server associated with the application, such as one of the remote application servers 224, 226, via an accelerated data link. The proxy module can be executable by the processing logic 204 to identify which of the remote application servers 224, 226 is associated with the particular application based on data stored in the database 214. In one embodiment, the proxy module 216 can be executable by the processing logic 204 to initiate the accelerated data link by, for instance, opening a VPN tunnel between the POP proxy server 202 and one of the remote application servers 224, 226.

In addition, the memory 206 includes a streaming module 218, such as an automatic streaming proxy, which is executable by the processing logic 204 to stream data between the user device 222 and a remote application server 224 or 226 to which the TCP/IP connection is relayed, until the TCP/IP connection is terminated.

In an illustrative embodiment, the modules 212-218 can be executable by the processing logic 204 to relay a second TCP/IP connection corresponding to a second particular application, which is not stored at the POP proxy server, from the POP proxy server 202 to a second remote application server associated with a second particular application via a second accelerated network link.

Figure 3:
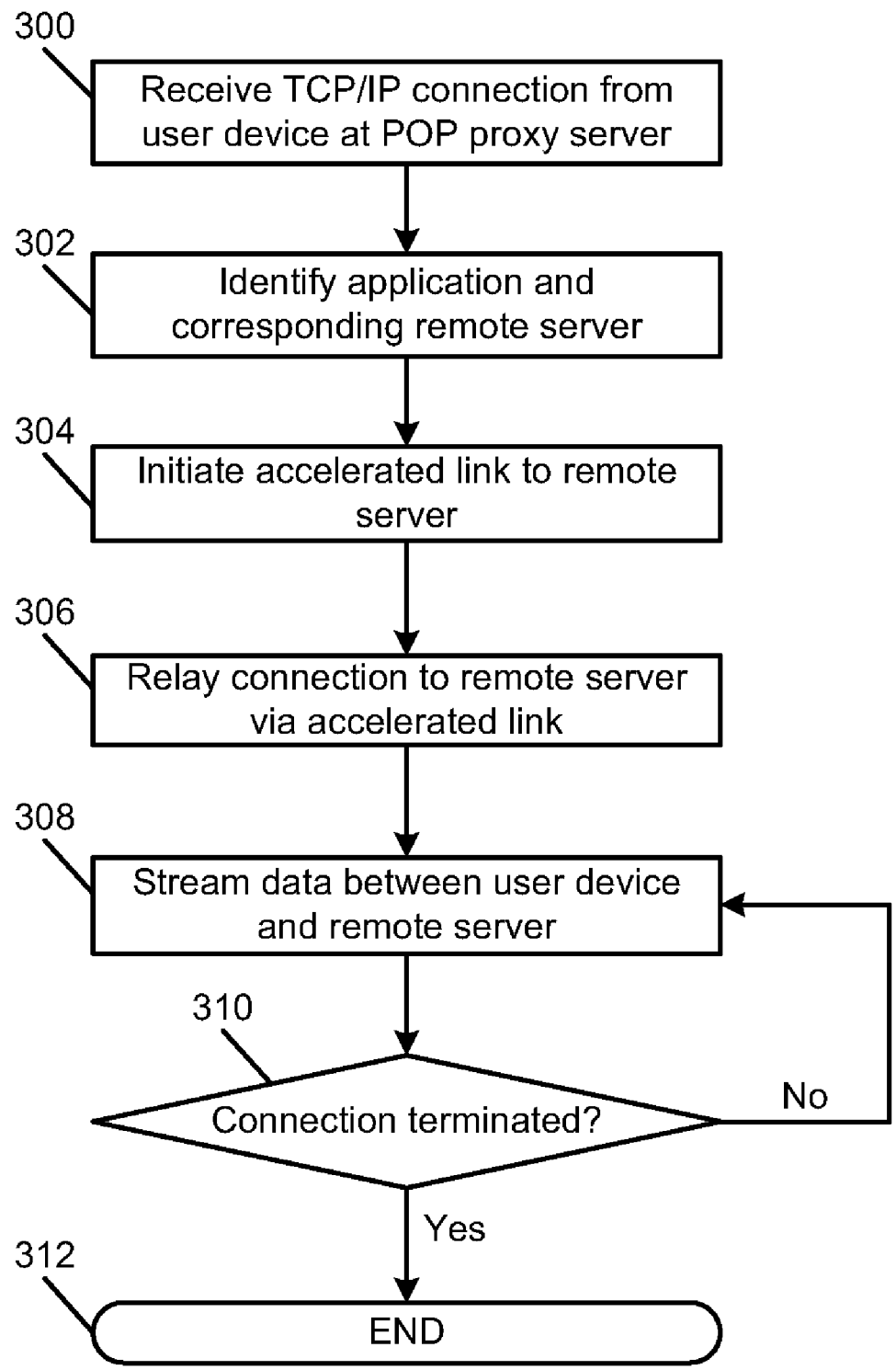
FIG. 3 is a flow diagram illustrating a particular embodiment of a method of providing a network service.

FIG. 3 illustrates a particular embodiment of a method of providing a network service. At block 300, a POP proxy server receives and accepts a TCP/IP connection from a user device. Moving to block 302, in a particular embodiment, the POP proxy server can identify a particular application corresponding to the connection and a remote application server that stores the particular application. In another embodiment, the POP proxy server can communicate with one remote application server, such that it does not separately identify the remote application server. In yet another embodiment, the POP proxy server can communicate with multiple remote application servers that store the particular application, such that the POP proxy server identifies a remote application server for a particular connection based on one or more load-balancing rules.

Proceeding to block 304, the POP proxy server initiates an accelerated data link between the POP proxy server and the remote application server that stores the particular application. Continuing to block 306, the POP proxy server relays the TCP/IP connection to the remote application server via the accelerated data link. Advancing to block 308, the POP proxy server streams data between the user device and the remote application server. At decision node 310, the POP proxy server can determine whether the user device, POP server or remote application server has terminated the TCP/IP connection. If the connection has not been terminated, the method returns to block 308. The method terminates at 312.

Figure 4:
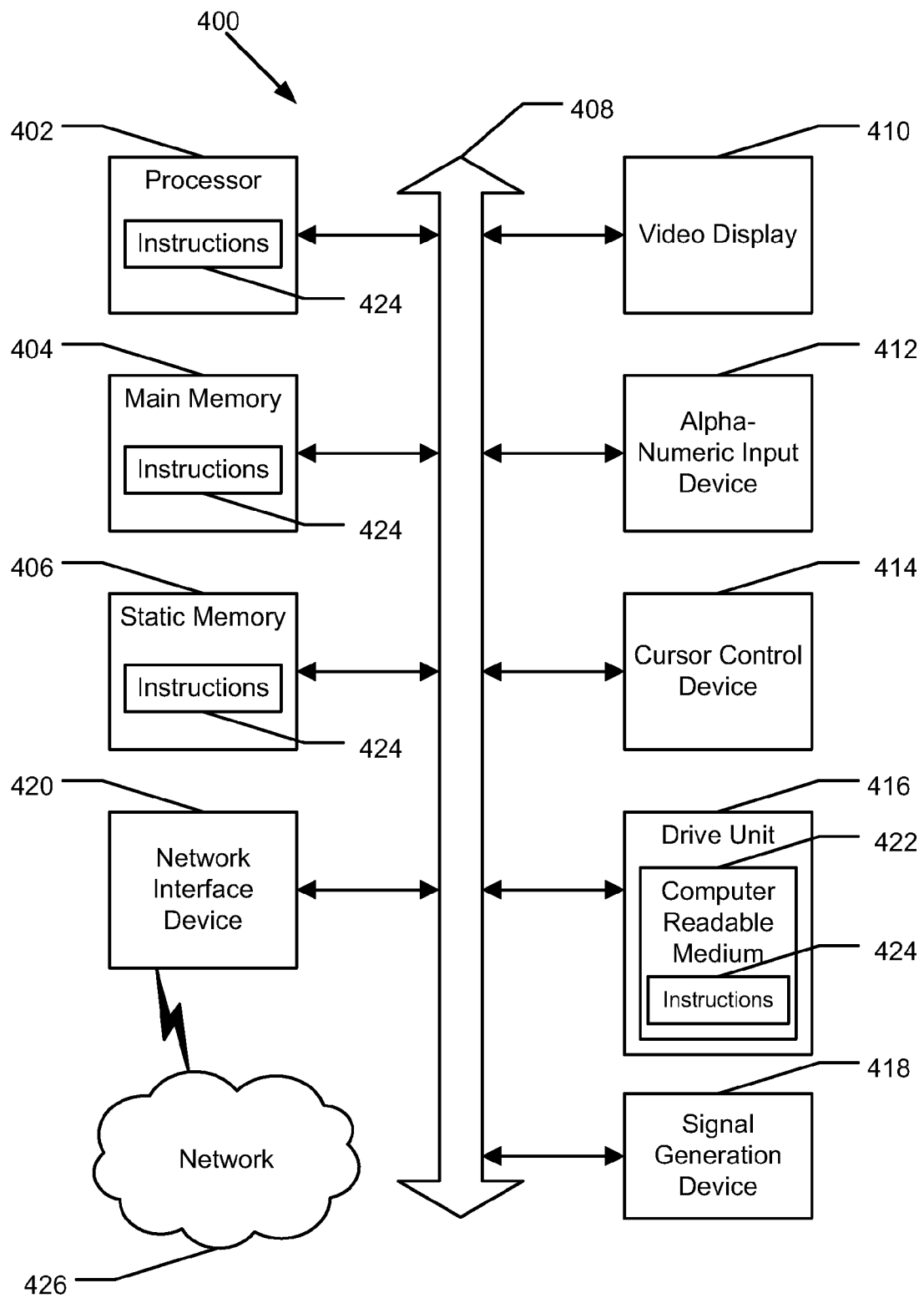
FIG. 4 is a block diagram illustrating a particular embodiment of a general computer system.

FIG. 4 shows an illustrative embodiment of a general computer 400 including a set of instructions that can be executed to cause the computer system to perform any one or more of the methods or computer based functions disclosed herein. The computer system 400 may operate as a standalone device or may be connected, e.g., using a network, to other computer systems or peripheral devices. In an illustrative embodiment, such standalone and peripheral devices can include, for example, POP proxy servers, remote application servers, user devices, other network elements, or any combination thereof, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, a virtual machine or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or subsystems that individually or jointly execute a set, or multiple sets, of instructions to perform one or more computer functions.

The computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, such as a WAN, a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The data transfer rate of the accelerated data link can also be expressed as a percentage greater than the non-accelerated data link, such as an accelerated data transfer rate that is at least 1000% greater than the data transfer rate associated with the non-accelerated data link. Similarly, the data transfer rate of the non-accelerated data link can be expressed as a percentage of the data transfer rate of the accelerated data link, to indicate improved performance.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of providing a network service, the method comprising:
    accepting an incoming transmission control protocol/internet protocol (TCP/IP) connection from a user device at a point of presence (POP) proxy server, wherein the TCP/IP connection corresponds to a particular application that is not stored at the POP proxy server;
    relaying the TCP/IP connection from the POP proxy server to a remote application server that stores the particular application via an accelerated network link, wherein after the POP proxy server relays the TCP/IP connection to the remote application server via the accelerated network link, an effective rate of data transfer between the user device and the remote application server is substantially equal to a rate of data transfer between the user device and the POP server; and
    streaming data between the user device and the remote application server after relaying the TCP/IP connection to the remote application server.

2. The method of claim 1, further comprising identifying the remote application server that stores the particular application based on data associating a plurality of remote application servers with a plurality of applications.

3. The method of claim 1, further comprising selecting the remote application server from a plurality of remote application servers that each store the particular application, based on at least one load-balancing rule.

4. The method of claim 1, further comprising opening a virtual private network (VPN) tunnel from the POP proxy server to the remote application server, wherein the TCP/IP connection is relayed from the POP proxy server to the remote application server via the VPN tunnel.

5. The method of claim 1, wherein the streamed data includes dynamic data, file transfer data, static content data, web application data, or any combination thereof.

6. The method of claim 1, wherein the application is associated with a hypertext transfer protocol network service or a file transfer protocol network service.

7. A non-transitory computer-readable medium including processor-readable instructions that are executable by processing logic to perform a method, the method comprising:
    accepting an incoming transmission control protocol/internet protocol (TCP/IP) connection from a user device at a point of presence (POP) proxy server, wherein the TCP/IP connection corresponds to a particular application;
    simulating a local presence of a remote application server that stores the particular application, without storing the particular application at the POP proxy server, wherein simulating the local presence includes relaying the TCP/IP connection from the POP proxy server to the remote application server via an accelerated network link and streaming data between the user device and the remote application server after relaying the TCP/IP connection to the remote application server; and
    receiving data from the user device at the POP proxy server at a first data transfer rate and receiving data from the remote application server at a second data transfer rate via the accelerated data link, wherein the second data transfer rate is at least 50% greater than the first data transfer rate.

8. The non-transitory computer-readable medium of claim 7, wherein, after the POP proxy server relays the TCP/IP connection to the remote application server, an effective rate of communication between the user device and the remote application server is substantially equal to the first data transfer rate.

9. The non-transitory computer-readable medium of claim 7, wherein the streamed data is accessible to the user device at a data transfer rate greater than or substantially equal to 2 Mbps.

10. The non-transitory computer-readable medium of claim 7, wherein the user device, the POP proxy server, and the remote application server communicate via the Internet.

* * * * *